United States Patent
Po et al.

(10) Patent No.: US 8,109,254 B2
(45) Date of Patent: Feb. 7, 2012

(54) METHOD OF CONTROLLING THE SPARK LEAD OF AN INTERNAL COMBUSTION ENGINE

(75) Inventors: Giacomo Po, Ravarino (IT); Nicolo' Cavina, Bologna (IT); Luca Poggio, Casalecchio di Reno (IT)

(73) Assignee: Ferrari, S.p.A., Modena (IT)

( * ) Notice: Subject to any disclaimer, the term of this patent is extended or adjusted under 35 U.S.C. 154(b) by 313 days.

(21) Appl. No.: 12/158,990

(22) PCT Filed: Dec. 22, 2006

(86) PCT No.: PCT/IB2006/003752
§ 371 (c)(1),
(2), (4) Date: Oct. 28, 2008

(87) PCT Pub. No.: WO2007/072207
PCT Pub. Date: Jun. 28, 2007

(65) Prior Publication Data
US 2009/0241898 A1   Oct. 1, 2009

(30) Foreign Application Priority Data
Dec. 23, 2005  (IT) .............................. BO2005A0789

(51) Int. Cl.
*F02P 5/00* (2006.01)
(52) U.S. Cl. ............................ 123/406.38; 123/406.33
(58) Field of Classification Search ............. 123/406.33, 123/406.21, 406.29, 406.37, 406.38, 406.39; 701/111; 73/35.01, 35.03, 35.06–35.09, 73/35.11–35.13
See application file for complete search history.

(56) References Cited

U.S. PATENT DOCUMENTS

| | | | | |
|---|---|---|---|---|
| 4,300,503 A | * | 11/1981 | Deleris et al. | 123/406.21 |
| 4,331,117 A | * | 5/1982 | Ginsburgh | 123/406.21 |
| 4,711,212 A | * | 12/1987 | Haraguchi et al. | 123/406.38 |
| 4,711,214 A | * | 12/1987 | Sakakibara et al. | 123/406.38 |

(Continued)

FOREIGN PATENT DOCUMENTS
EP          0579271          1/1994
(Continued)

OTHER PUBLICATIONS

International Search Report for International Patent Application Serial No. PCT/IB2006/003752; Oct. 18, 2007.

*Primary Examiner* — Mahmoud Gimie
*Assistant Examiner* — David Hamaoui
(74) *Attorney, Agent, or Firm* — Kevin D. Jablonski; Graybeal Jackson LLP

(57) ABSTRACT

A method of controlling the spark lead of an internal combustion engine having at least one cylinder fitted with a spark plug; the method including the steps of: determining a standard spark lead value; determining an engine knock index in the cylinder; calculating a correction factor as a function of the engine knock index; determining a modified spark lead value by applying the correction factor to the standard spark lead value; and controlling the spark plug using the modified spark lead value. The correction factor is calculated by statistically analyzing a number of engine knock indexes to calculate a cumulative distribution; comparing the cumulative distribution with at least one target value; and modifying the current correction factor value as a function of the comparison between the cumulative distribution and the target value.

20 Claims, 4 Drawing Sheets

U.S. PATENT DOCUMENTS

| | | | | |
|---|---|---|---|---|
| 4,991,553 A | * | 2/1991 | Kurihara et al. | 123/406.37 |
| 4,993,387 A | * | 2/1991 | Sakakibara et al. | 123/406.33 |
| 5,099,681 A | * | 3/1992 | Dils | 73/35.07 |
| 5,743,233 A | * | 4/1998 | Unland et al. | 123/406.37 |
| 6,456,927 B1 | * | 9/2002 | Frankowski et al. | 701/111 |
| 6,513,510 B2 | * | 2/2003 | Hyung-Kee | 123/696 |
| 6,529,817 B2 | * | 3/2003 | Torno et al. | 701/111 |
| 6,688,286 B2 | * | 2/2004 | Kokubo et al. | 123/406.33 |
| 6,701,894 B2 | * | 3/2004 | Katagami | 123/406.33 |
| 6,851,411 B2 | * | 2/2005 | Nagaishi et al. | 123/406.34 |
| 6,945,229 B1 | * | 9/2005 | Zhu et al. | 123/406.21 |
| 7,174,251 B2 | * | 2/2007 | Iwamoto et al. | 701/111 |
| 7,181,338 B2 | * | 2/2007 | Takemura et al. | 701/111 |
| 7,213,573 B2 | * | 5/2007 | Daniels et al. | 123/406.28 |
| 2002/0179053 A1 | | 12/2002 | Kokubo et al. | |

FOREIGN PATENT DOCUMENTS

| | | |
|---|---|---|
| EP | 0922948 | 6/1999 |
| GB | 2231918 | 11/1990 |

* cited by examiner

METHOD OF CONTROLLING THE SPARK LEAD OF AN INTERNAL COMBUSTION ENGINE

RELATED APPLICATION DATA

This application is a United States national phase application filed pursuant to 35 USC §371 of International Patent Application Ser. No. PCT/IB2006/003752, filed Dec. 22, 2006, which application claims priority to Italian Patent Application Serial No. BO2005A000789, filed Dec. 23, 2005, which applications are incorporated herein by reference in their entireties.

TECHNICAL FIELD

An embodiment of the present invention relates to a method of controlling the spark lead of an internal combustion engine.

BACKGROUND

An internal combustion engine comprises a number of cylinders, each of which has a piston, which slides cyclically inside the cylinder, and a spark plug controlled cyclically by an electronic central control unit to produce a spark between its electrodes and so ignite the compressed gas inside the cylinder. The central control unit comprises a memory containing a number of maps of spark plug control values as a function of the current engine status. More specifically, the maps give the spark lead value for each spark plug, i.e. the value of the angular interval between ignition, i.e. the spark between the spark plug electrodes, and the top dead center or TDC position of the piston. If the spark lead value is zero, then ignition, i.e. the spark between the spark plug electrodes, occurs precisely at the top dead center or TDC position of the piston.

The spark lead values memorized in the central control unit maps are determined at the engine tuning stage to ensure efficient combustion in all possible operating conditions, and good thermal efficiency of the engine, while at the same time safeguarding the engine itself, i.e. against excessive engine knock in the cylinders. Combustion, however, is affected by numerous factors (foremost of which being fuel characteristics, cylinder head temperature, and wear of the spark plugs) which are substantially impossible to predict accurately. For this reason, a knock sensor is used to determine the presence of or excessive engine knock in the cylinders. In the event of excessive engine knock in the cylinders, this is eliminated by the central control unit reducing the spark lead value with respect to the map value.

The central control unit controlling the spark plugs traditionally employs the memory map spark lead value, and reduces it in the event of excessive engine knock in the cylinders. This is a preventive control strategy, in that its sole object is to safeguard the engine by modifying the map spark lead value in the event of excessive engine knock in the cylinders.

It has recently been observed that a small amount of engine knock is other than negative, and in fact provides for improving combustion (and therefore maximizing thermal efficiency) without compromising the engine. A more aggressive spark lead control strategy has therefore been proposed, whereby the map spark lead value is not only modified in the event of excessive engine knock, but also to obtain a small amount of engine knock to optimize combustion in the cylinders. Typically, the more aggressive strategy provides for steadily increasing the map spark lead value until a predetermined maximum knock level is reached; at which point, the spark lead is reduced in steps to such a value as to eliminate knock, and is then increased steadily again.

Tests show that, as compared with the conventional preventive strategy, the aggressive strategy described provides for improving thermal efficiency of the engine and so increasing drive torque for a given fuel consumption (or reducing fuel consumption for a given drive torque). The same tests, however, also show the aggressive strategy to be only capable of maintaining optimum combustion for a few short periods, with the result that combustion efficiency on average is good but not excellent.

U.S. Pat. No. 4,711,212A1 discloses an anti-knocking control system for controlling an internal combustion engine to prevent knocking in accordance with a knocking condition detected by a knock detecting apparatus on the basis of a distribution pattern of knock magnitude values derived from the output signal of a knock sensor; the knock detection apparatus is arranged to derive a knock magnitude value from the output signal of the knock sensor generated within a predetermined engine rotational angle at an interval thereby obtaining a plurality of knock magnitude values, determine a pattern of distribution of the plurality of the knock magnitude values on the basis of the results of comparison between the frequency that the knock magnitude value exceeds an upper threshold value and the frequency that the knock magnitude value goes below a lower threshold value, and detect a knocking condition of the engine in accordance with the determined distribution pattern.

SUMMARY

An embodiment of the present invention is a method of controlling the spark lead of an internal combustion engine, which is cheap and easy to implement and at the same time eliminates the aforementioned drawbacks.

BRIEF DESCRIPTION OF THE DRAWINGS

One or more non-limiting embodiment of the present invention will be described by way of example with reference to the accompanying drawings, in which.

DETAILED DESCRIPTION

Figure 1:
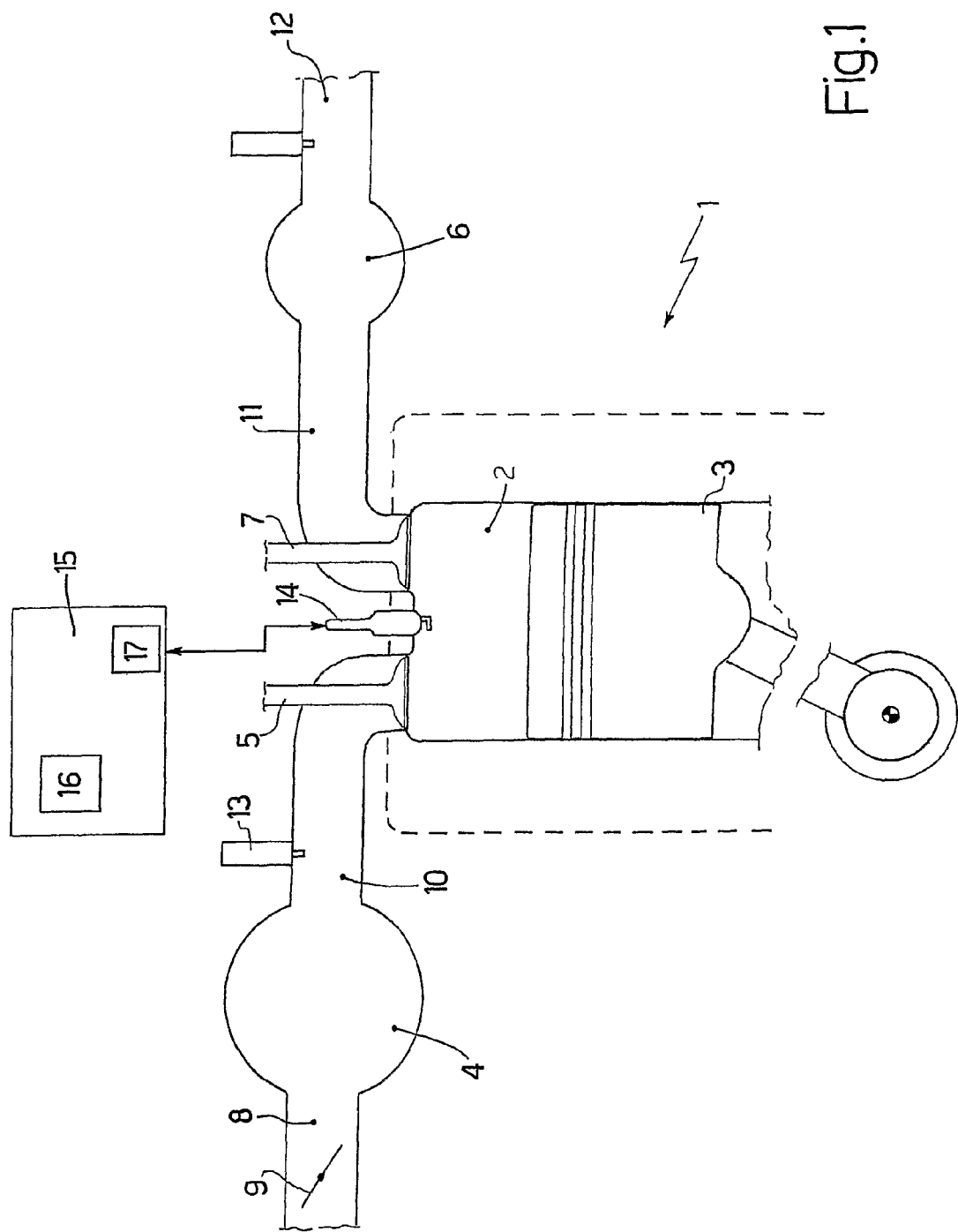
FIG. 1 shows a schematic of an internal combustion engine operating according to an embodiment of a method of the present invention.

Number 1 in FIG. 1 indicates as a whole an internal combustion engine having eight cylinders 2 (only one shown in FIG. 1) divided into two groups of four cylinders 2 each. Each cylinder 2 houses a piston 3, which slides cyclically inside cylinder 2; and each cylinder is connected to an intake manifold 4 by two intake valves 5 (only one shown in FIG. 1), and to an exhaust manifold 6 by two exhaust valves 7 (only one shown in FIG. 1).

Two intake manifolds 4 are provided, each of which receives fresh air (i.e. outside air) along a feed pipe 8 regulated by a throttle valve 9, and is connected to cylinders 2 in the same group by respective intake pipes 10 (only one shown in FIG. 1) regulated by intake valves 5. Similarly, two exhaust manifolds 6 are provided, each of which is connected to cylinders 2 in the same group by respective exhaust pipes 11 (only one shown in FIG. 1) regulated by exhaust valves 7. An emission pipe 12 extends from exhaust manifold 6, and terminates with a known muffler (not shown) to emit the combustion gas into the atmosphere.

In an embodiment, fuel (e.g. gasoline, methane, or LPG) is injected into each intake pipe 10 by an injector 13 located close to intake valves 5. In a different embodiment, not shown, injectors 13 are housed inside cylinders 2 to inject fuel directly into each cylinder 2. Each cylinder 2 comprises a spark plug 14 fitted through the top of cylinder 2, centrally positioned between intake valves 5 and exhaust valves 7, and which is activated cyclically to ignite the compressed gas inside cylinder 2 at the end of each compression stroke.

Engine 1 comprises a central control unit 15, which controls spark plugs 14 to ignite the compressed gas inside each cylinder 2. Central control unit 15 comprises a memory 16 containing a number of maps of spark plug 14 control values as a function of the current engine status. More specifically, the maps in memory 16 give the spark lead AA value for each spark plug 14, i.e. the value of the angular interval between ignition, i.e. the spark between the electrodes of spark plug 14, and the top dead center or TDC position of piston 3. If the spark lead AA value is zero, then ignition, i.e. the spark between the electrodes of spark plug 14, occurs precisely at the top dead center or TDC position of piston 3.

For each combustion of each cylinder 2, an engine knock index Ikn is calculated representing the engine knock level of the combustion in question. The engine knock index Ikn is calculated by central control unit 15 by appropriately processing a signal from one or more knock sensors 17 connected to central control unit 15. More specifically, the engine knock index Ikn of each cylinder 2 ranges between a zero value, indicating no engine knock at all, and a maximum value, indicating entirely knocking combustion. Each sensor 17 comprises a current gauge (not shown) located in series with the electric circuit of spark plug 14 to measure ionizing current flow across the electrodes during combustion.

Figure 2:
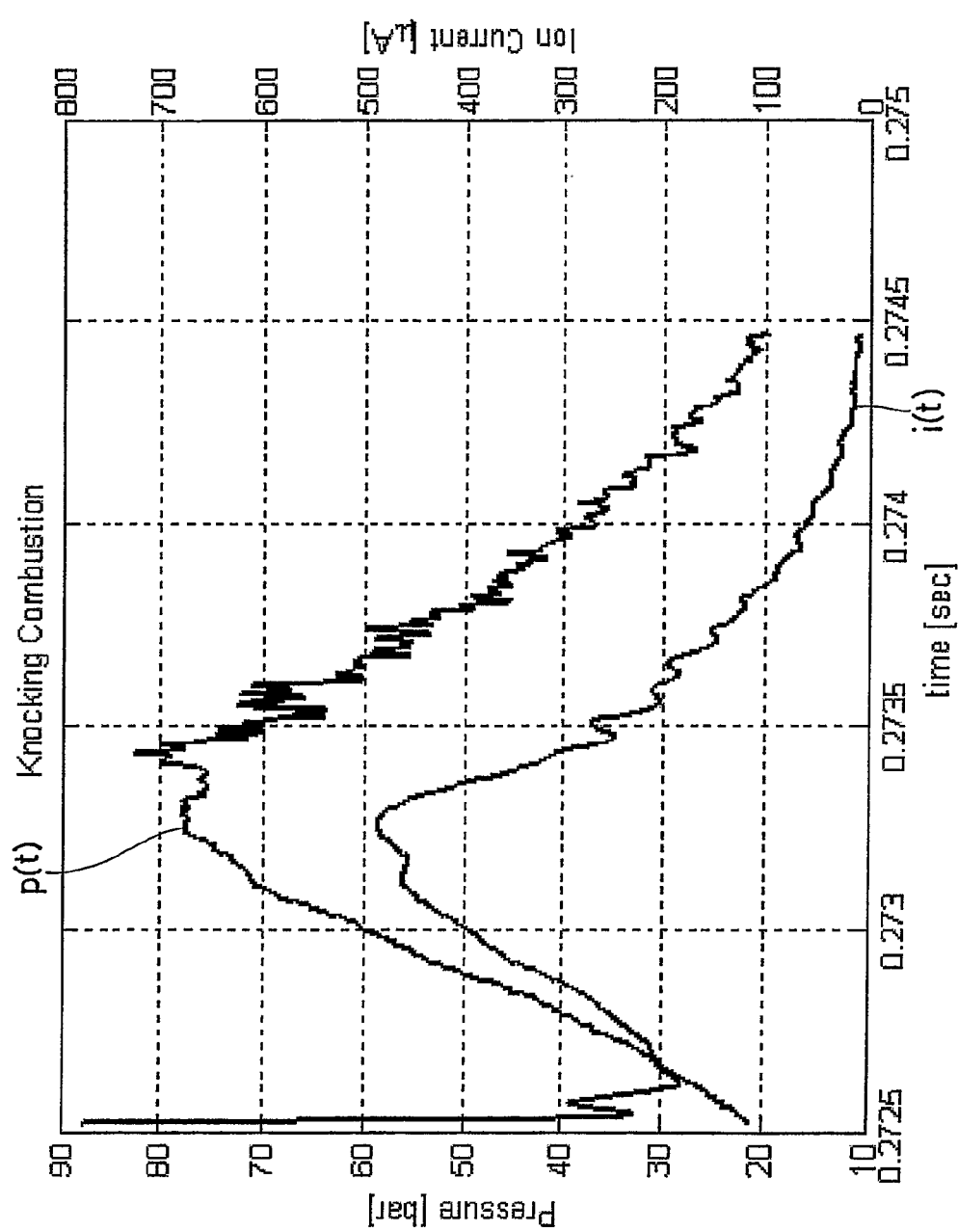
FIG. 2 shows a cartesian time graph of the pressure inside a cylinder of the FIG. 1 engine, and of ionizing current flow across the electrodes of a spark plug connected to the cylinder.

The engine knock index Ikn is calculated using the measurement of the ionizing current flow across the electrodes of a spark plug 14 at the thermal stage and within a predetermined angular window (e.g. of 70° from the TDC position). For example, FIG. 2 shows a cartesian time graph of the pressure inside a cylinder 2, and of ionizing current flow across the electrodes of the respective spark plug 14.

The ionizing current measurement is multiplied by an antileakage (e.g. Hanning) window to eliminate discontinuities, and the FFT (Fast Fourier Transform) of the ionizing current is then calculated. At this point, the ionizing current FFT frequency integral is calculated in a number of predetermined frequency bands, and the engine knock index Ikn is calculated by adding the integral results. In one possible embodiment, each integral result is multiplied by a weight coefficient, which increases in value as a function of the frequency of the respective band, so that the contribution of the higher frequency bands are attributed greater importance.

Figure 3:
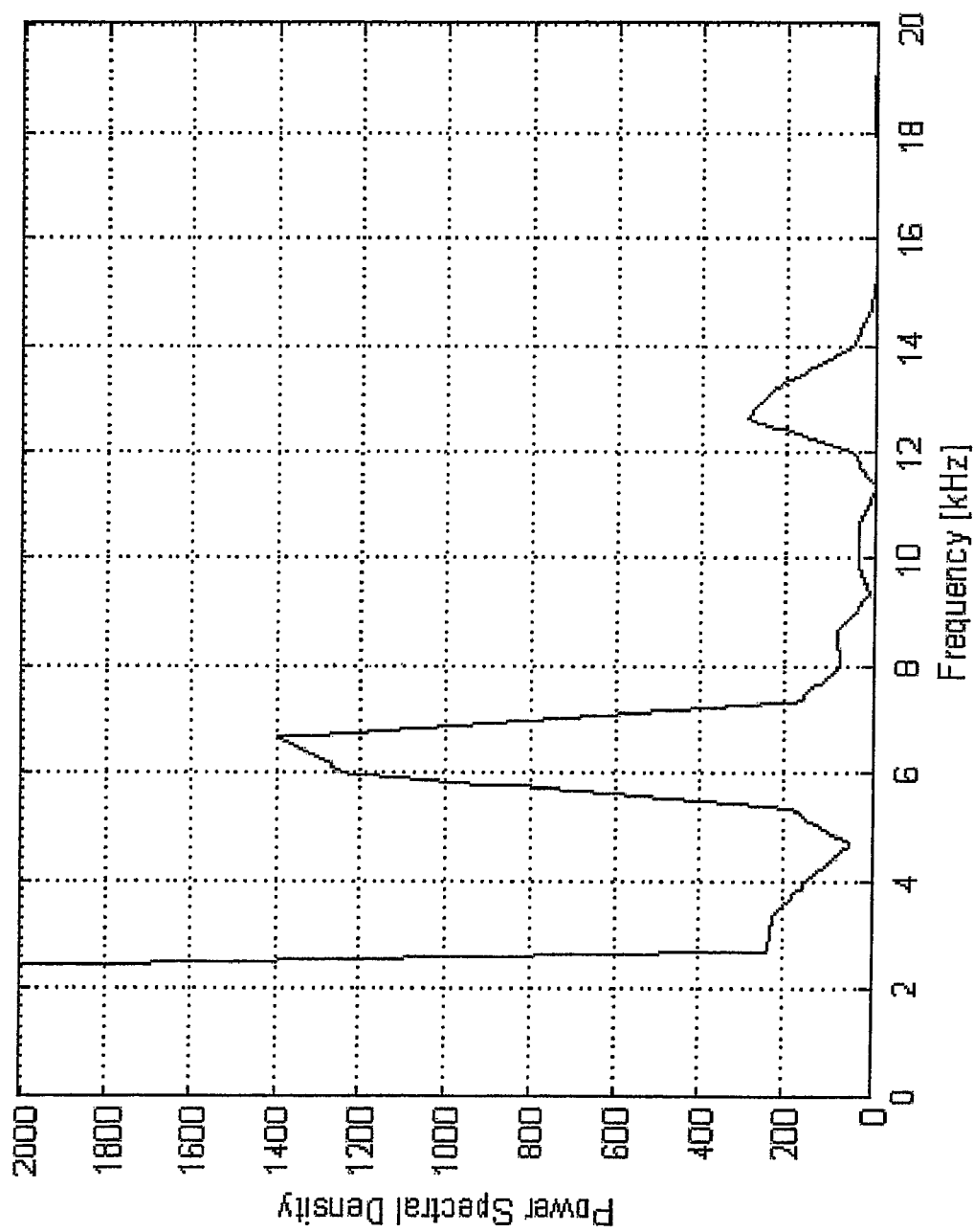
FIG. 3 shows a cartesian graph of the result of an FFT (Fast Fourier Transform) of the ionizing current in FIG. 2.

The ionizing current FFT frequency integral may be calculated in at least two bands centered about predetermined frequencies and depending on the characteristics of engine 1 (e.g. 6 kHz and 13 kHz). By way of example, the FIG. 3 cartesian graph shows the result of an FFT (Fast Fourier Transform) of the ionizing current in FIG. 2.

When engine 1 is running, central control unit 15 determines a standard spark lead AA value using the maps in memory 16, calculates a correction factor Cf (which may be positive, negative or zero), determines a modified spark lead AA value by applying correction factor Cf to the standard spark lead AA value, and, at the next combustion, controls spark plug 14 using the modified spark lead AA value.

Correction factor Cf is calculated using the value of engine knock index Ikn, which is calculated at each combustion as described above. More specifically, central control unit 15 performs a statistical analysis of a number of (e.g. the last 128) engine knock indexes Ikn, including the last one determined, to calculate a cumulative distribution of engine knock indexes Ikn. At this point, central control unit 15 compares the cumulative distribution with at least one predetermined target value Ptarget, and modifies the current correction factor Cf value (i.e. the last value used) as a function of the comparison between the cumulative distribution and the target value Ptarget.

Comparing the cumulative distribution with target value Ptarget comprises determining the percentage of engine knock indexes Ikn below a threshold value Vtarget, and comparing the percentage of engine knock indexes Ikn below the threshold value Vtarget with target value Ptarget. The purpose of modifying correction factor Cf is to ensure the percentage of engine knock indexes Ikn below threshold value Vtarget equals target value Ptarget. Consequently, if the percentage of engine knock indexes Ikn below threshold value Vtarget equals target value Ptarget, the current value of correction factor Cf remains unchanged; if the percentage of engine knock indexes Ikn below threshold value Vtarget is below target value Ptarget, the current value of correction factor Cf is increased; and, if the percentage of engine knock indexes Ikn below threshold value Vtarget is above target value Ptarget, the current value of correction factor Cf is reduced.

Target value Ptarget may normally range between 90 and 99, and may preferably range between 97 and 99. Threshold value Vtarget and target value Ptarget are such as to ensure most of the engine knock indexes Ikn are sufficiently below a danger threshold endangering engine 1, and also to achieve maximum torque of engine 1.

To safeguard engine 1, central control unit 15 further determines whether the last (e.g. the last 1, 2, 3 or 4) engine knock indexes Ikn are above a safety value Vs, and, if they are, makes an immediate drastic reduction in the spark lead AA value to eliminate the excessive engine knock as quickly as possible. In the event of prolonged excessive engine knock (i.e. as opposed to a single isolated episode, a series of excessive engine knocks potentially dangerous to engine 1), this further control level ensures faster reaction than the statistical-based control described above.

In an embodiment, correction factor Cf is calculated as the sum of three contributions: an adaptive contribution Cfa, a fast contribution Cfv, and a protective contribution Cfp.

Adaptive and fast contributions Cfa and Cfv are calculated by statistically analysing a number of (e.g. the last 128) engine knock indexes Ikn of each cylinder 2 to calculate a cumulative distribution of engine knock indexes Ikn. At this point, the cumulative distribution percentage value assumed at threshold value Vtarget is compared by central control unit 15 with target value Ptarget (e.g. 98% of events). If the cumulative distribution percentage value assumed at threshold value Vtarget is below target value Ptarget, central control unit 15 imposes a positive correction of one lead step of fast contribution Cfv. Conversely, if the cumulative distribution percentage value assumed at threshold value Vtarget is above target value Ptarget, central control unit 15 makes no correction (i.e. imposes a zero correction) of fast contribution Cfv.

As regards adaptive contribution Cfa, central control unit 15 low-pass filters the cumulative distribution to obtain new statistics slower than the previous, and on the basis of which it cumulatively modifies the current value of adaptive contribution Cfa, and memorizes the end value in an adaptive map.

The purpose of modifying correction factor Cf obtained as the sum of the two adaptive and fast contributions Cfa and Cfv is to ensure the percentage of engine knock indexes Ikn below threshold value Vtarget is guaranteed statistically over both the short and long term.

Protective contribution Cfp constitutes a reduction of spark lead AA individually for each cylinder 2, upon the last engine knock index Ikn of cylinder 2 exceeding a predetermined protection value Vp memorized in central control unit 15, and is such as to always restore cylinder 2 to the no-knock condition. It is important to note that, to safeguard engine 1, protective contribution Cfp is always active, and has priority over the other control levels to ensure, in the event of excessive engine knock, faster reaction than the statistical-based control described above.

Figure 4:
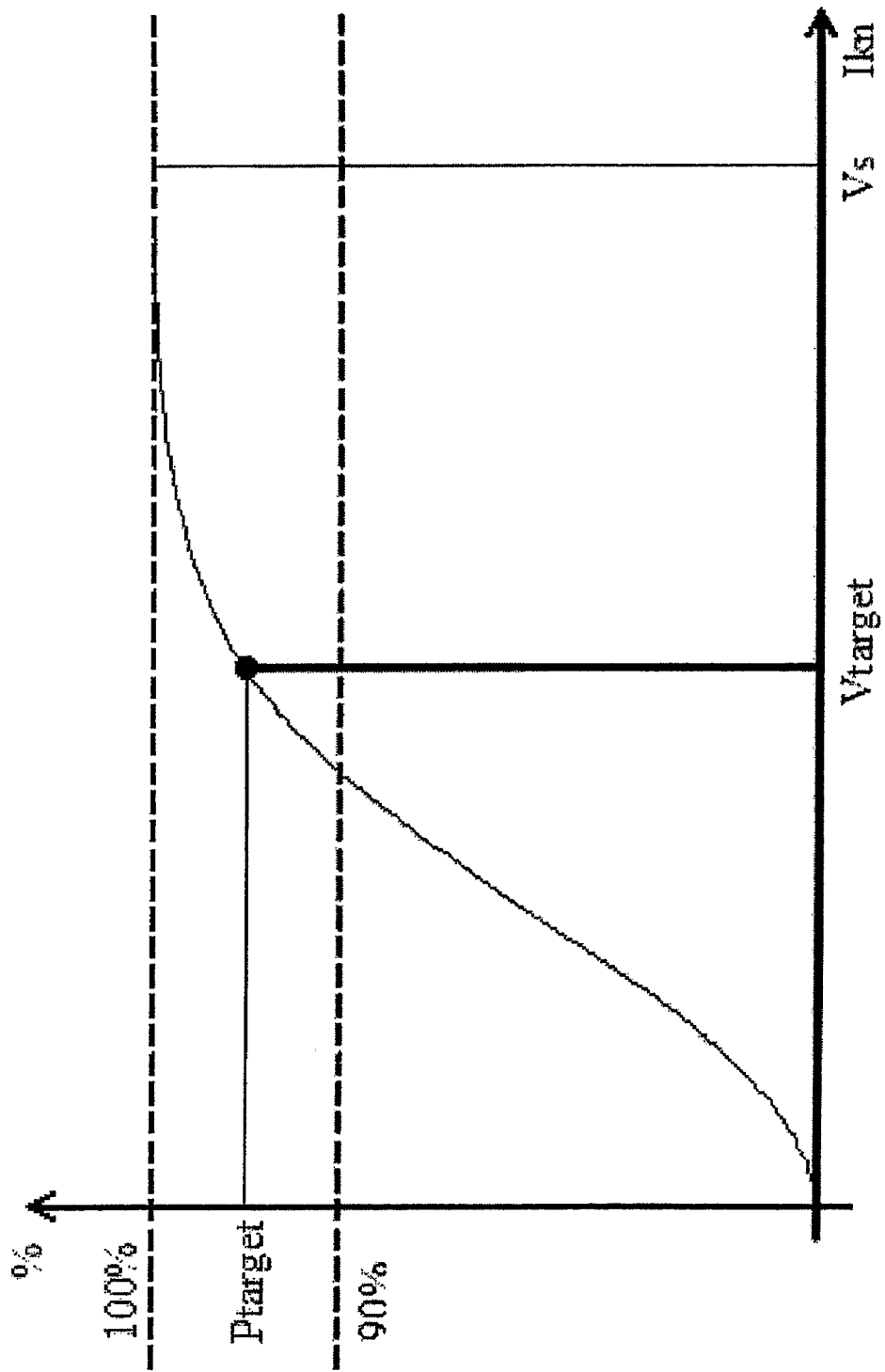
FIG. 4 shows a cartesian graph of cumulative distribution of an engine knock index.

By way of example, FIG. 4 shows a cartesian graph of a cumulative distribution of engine knock index Ikn. The control method described above is applied individually to each cylinder 2—i.e. for each cylinder 2, a corresponding engine knock index Ikn and a corresponding correction factor Cf are determined—to compensate for inevitable differences between the cylinders in terms of both manufacturing tolerances and different cylinder wall temperatures caused by the different positions of cylinders 2 inside engine 1.

It is important to note that, when engine 1 is turned on, a correction factor Cf equal to adaptive contribution Cfa is used, and adaptive contribution Cfa and fast contribution Cfa are zero; and, when engine 1 is running, correction factor Cf is modified as described above to optimize combustion in each cylinder 2.

In an embodiment, using self-adapting techniques, the standard spark lead AA values in the maps in memory 16 are corrected continually using factor Cf to adapt continually to the current engine knock level.

The Ptarget, Vtarget, Vs and Vp values described above are determined when calibrating and tuning engine 1, for example, to achieve the best possible combustion, and, depending on the characteristics of engine 1, may be either constant or vary as a function of engine status (e.g. as a function of the cooling fluid temperature of engine 1).

An embodiment of the method described above of controlling spark lead AA is reliable and easy to implement, on account of its simplicity, and is highly effective in optimizing combustion inside cylinders 2, by taking into account inevitable dispersion of engine knock index Ikn. In other words, as opposed to operating as a function of one engine knock index Ikn, the embodiment of the method described above of controlling spark lead AA analyzes a number of engine knock indexes Ikn statistically, to achieve, for example, the best possible combustion on average inside cylinders 2.

The invention claimed is:

1. A method of controlling the spark lead of an internal combustion engine comprising at least one cylinder fitted with a spark plug; the method comprising the steps of:
    determining a standard spark lead value;
    determining an engine knock index in the cylinder for each of a plurality of combustions for the cylinder, the engine knock index representing an engine knock level of the combustion in the cylinder that is calculated from a signal from at least one engine knock sensor;
    calculating a correction factor as a function of the engine knock indexes;
    determining a modified spark lead value by applying the correction factor to the standard spark lead value; and
    controlling the spark plug using the modified spark lead value;
    wherein the step of calculating the correction factor comprises the further steps of:
        statistically analyzing at least thirty-two consecutive engine knock indexes to calculate a cumulative distribution of the engine knock indexes;
        determining the percentage of engine knock indexes below a threshold value;
        comparing the percentage of engine knock indexes below the threshold value with a target value indicating a desired percentage of engine knock indexes; and
        modifying the current correction factor value as a function of the comparison between the cumulative distribution and the target value to ensure the percentage of engine knock indexes below the threshold value equals the target value.

2. A method as claimed in claim 1, wherein the correction factor is calculated as the sum of three contributions: an adaptive contribution, a fast contribution, and a protective contribution.

3. A method as claimed in claim 2, wherein the percentage value assumed by the cumulative distribution at the threshold value is compared with the target value; if the percentage value assumed by the cumulative distribution at the threshold value is below the target value, a positive correction of one lead step of the fast contribution is imposed; and, if the percentage value assumed by the cumulative distribution at the threshold value is above the target value, the value of the fast contribution is zeroed.

4. A method as claimed in claim 3, wherein the cumulative distribution is low-pass filtered to obtain new statistics slower than the previous, and on the basis of which the current adaptive contribution value is modified cumulatively.

5. A method as claimed in claim 2, wherein the protective contribution constitutes a reduction of the spark lead, which intervenes, upon the last engine knock index exceeding a predetermined protection value, to maintain the cylinder in no-knock condition.

6. A method as claimed in claim 2, wherein, when the engine is turned on, a zero correction factor equal to the adaptive contribution is used, and the adaptive contribution and fast contribution are zero.

7. A method as claimed in claim 1, wherein, if the percentage of engine knock indexes below the threshold value equals the target value, then the current correction factor value remains unchanged.

8. A method as claimed in claim 1, wherein, if the percentage of engine knock indexes below the threshold value is below the target value, then the current correction factor value is increased.

9. A method as claimed in claim 1, wherein, if the percentage of engine knock indexes below the threshold value is above the target value, then the current correction factor value is reduced.

10. A method as claimed in claim 1, wherein, if the percentage of engine knock indexes below the threshold value equals the target value, then the current correction factor value remains unchanged; if the percentage of engine knock indexes below the threshold value is below the target value, then the current correction factor value is increased; and, if the percentage of engine knock indexes below the threshold value is above the target value, then the current correction factor value is reduced.

11. A method as claimed in claim 1, wherein the target value ranges between 90 and 99.

12. A method as claimed in claim 11, wherein the target value ranges between 97 and 99.

13. A method as claimed in claim 1, wherein, if the last engine knock index/indexes exceeds/exceed a safety value, the correction factor is immediately reduced drastically.

14. A method as claimed in claim 1, wherein, using self-adapting techniques, the standard spark lead values are modified using mean correction factor values.

15. A method as claimed in claim 1, wherein the engine knock index is calculated by determining the ionizing current flow across the electrodes of the spark plug during combustion.

16. A method as claimed in claim 15, wherein calculating the engine knock index comprises the steps of:
- measuring the ionizing current flow across the electrodes of the spark plug during combustion;
- multiplying the ionizing current measurement by a Hanning window to eliminate discontinuities;
- calculating the FFT of the ionizing current;
- calculating the ionizing current FFT frequency integral in a number of predetermined frequency bands;
- calculating the engine knock index by adding the integral results.

17. A method as claimed in claim 16, wherein the ionizing current FFT frequency integral is calculated in at least two bands centered about respective predetermined frequencies.

18. A method as claimed in claim 16, wherein the integrals are multiplied by respective weight coefficients, which increase in value as a function of the frequency values of the respective bands, so that the contributions of the higher frequency bands are attributed greater importance.

19. A method as claimed in claim 15, wherein the engine knock index is calculated on the basis of the ionizing current generated at the thermal stage and within a predetermined angular window.

20. A method as claimed in claim 1, wherein the standard spark lead value is supplied by a map stored in a memory of a central control unit.

* * * * *